May 15, 1945.  J. H. REIFENBERG  2,375,871
LIQUID HEATING APPARATUS
Filed Jan. 5, 1943  2 Sheets-Sheet 1

INVENTOR
JOSEPH H. REIFENBERG
BY
ATTORNEY

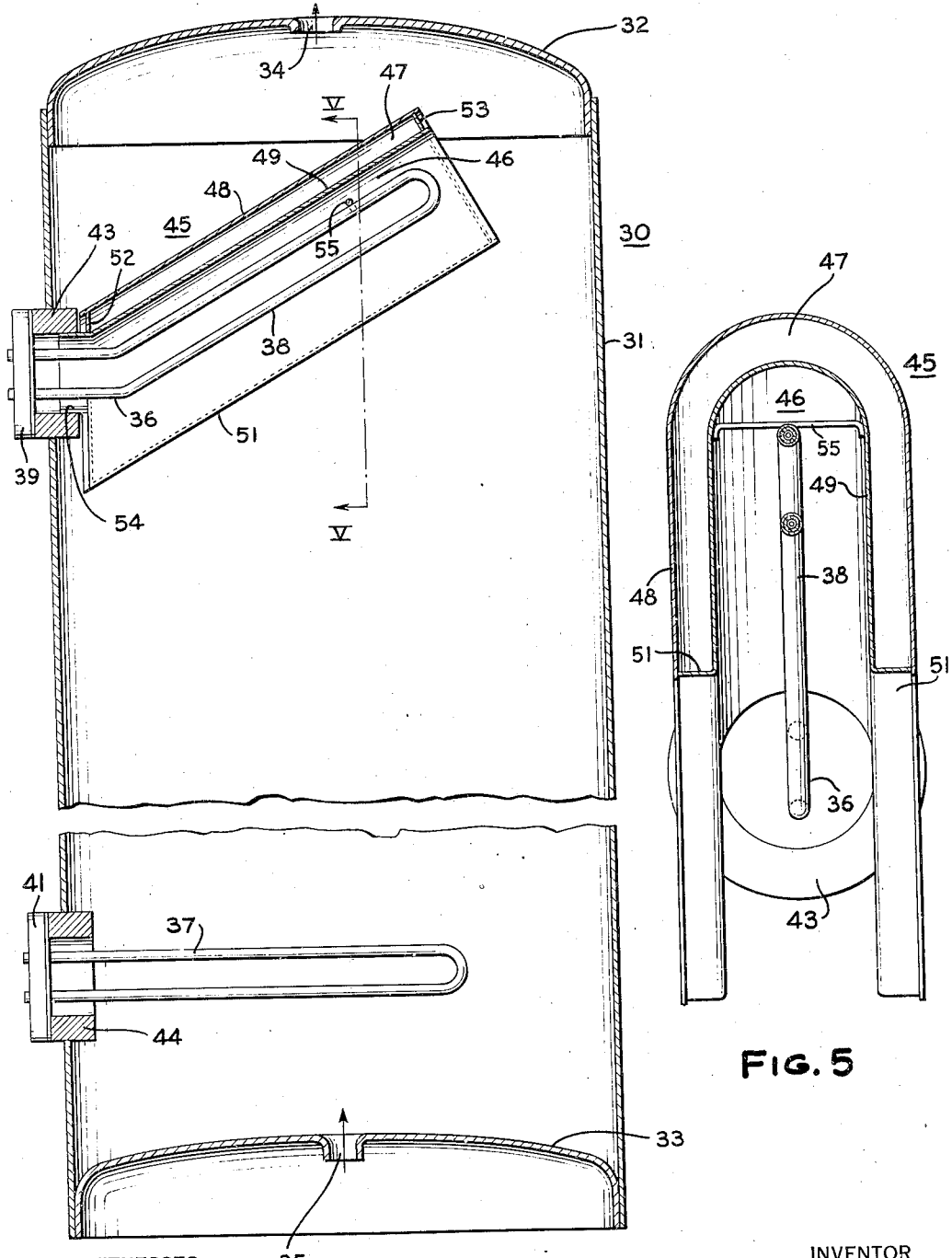

Patented May 15, 1945

2,375,871

UNITED STATES PATENT OFFICE 2,375,871

LIQUID HEATING APPARATUS

Joseph H. Reifenberg, Mansfield, Ohio, assignor to Westinghouse Electric & Manufacturing Company, East Pittsburgh, Pa., a corporation of Pennsylvania Application January 5, 1943, Serial No. 471,327

10 Claims. (Cl. 219—39)

My invention relates to liquid heating apparatus and has for an object to provide improved apparatus of this kind.

A further object of my invention is to rapidly heat the liquid adjacent the offtake of the heater tank so that small quantities of heated liquid are quickly made available for use, even though the remainder of the liquid in the tank is cool.

These and other objects are effected by my invention as will be apparent from the following description and claims taken in accordance with the accompanying drawings, forming a part of this application, in which:

Fig. 4 is a vertical sectional view of a water heater defining a second embodiment of my invention; and, Fig. 5 is a section taken along the line V—V of Fig. 4.

While my invention may be applied to various forms of electrically-energized liquid heaters, it is particularly applicable to electric water heaters of the so-called domestic type for heating tap water in residences or the like. An objection to the present forms of electric water heaters is the slow recovery rate which prevails because of limitations imposed by the power companies on the wattage which may be installed for this service. In present designs, a secondary or booster heating element and thermostat are located in an upper location in the tank so as to heat approximately the upper quarter of the tank. This represents an improvement over prior designs, but the time required to heat this quantity of water is still too long for satisfactory service under all conditions.

In order to obtain the maximum use of the upper or booster heating element and obtain hot water in the shortest period of time, I propose to direct the heated water to the top portion of the tank containing the water offtake. Accordingly, the hot water line progressively moves downwardly as the quantity of hot water increases. In present day apparatus, the heating element uniformly heats all of the water above its level so that it is not possible to obtain hot water until the entire volume is heated although only a small quantity of hot water might be required. In order to concentrate the heated water at the top of the tank, I provide an insulated hood or baffle which is aligned above the upper heating element for collecting the hot water rising from the element. This hood is attached at its ends to the wall of the tank and slopes upwardly and inwardly of the tank for facilitating the movement of heated water toward the top of the tank. Preferably, the hood or baffle structure is insulated to prevent loss of heat to the surrounding body of lower temperature water. The hood structure is insulated, preferably, by forming its parts with double walls having a watertight dead air space between the walls.

Figure 1:
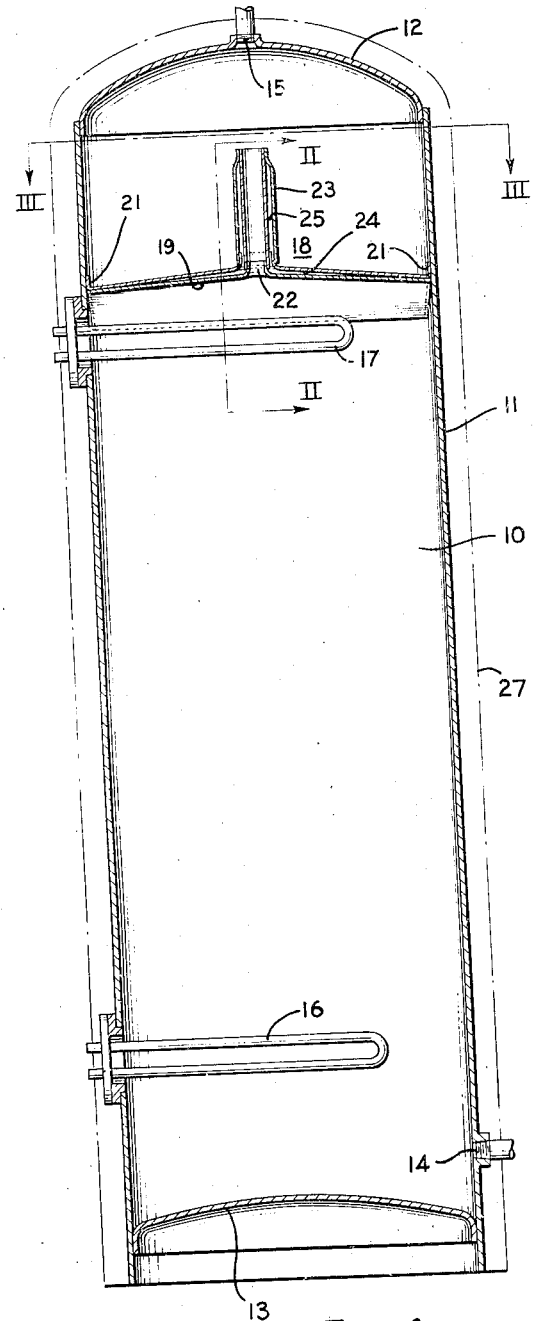
Fig. 1 is a vertical sectional view through an electrically-heated water heater constructed in accordance with my invention.
Figure 2:
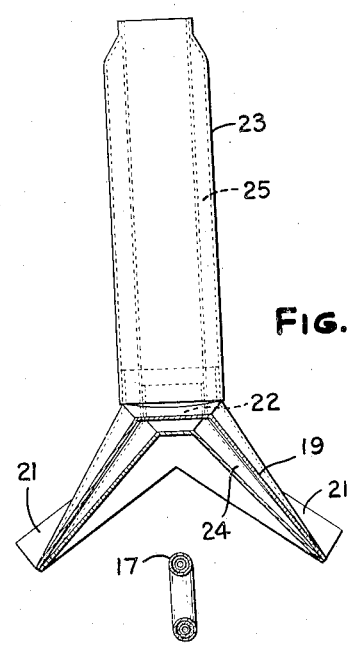
Fig. 2 is a sectional view taken along the line II—II of Fig. 1.
Figure 3:
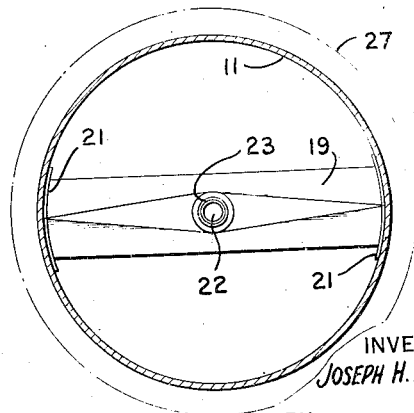
Fig. 3 is a sectional view taken along the line III—III of Fig. 1.

Reference will now be had to Figs. 1 to 3, inclusive, of the drawings wherein I have shown my invention applied to a domestic type of water heater including a vertical, generally cylindrical, tank 10 having a side wall 11 and upper and lower headers 12 and 13. Water to be heated enters the tank through a port 14 communicating with a lower region of the tank and the heated water is conveyed from the tank through a port 15 formed in the header 12 and communicating with the uppermost region of the tank. The water is heated by electrically energized heating elements 16 and 17 of any well-understood construction. The heaters 16 and 17 may include a heating element, not shown, suitably enclosed within a metallic tubular casing which is bent in the form of a hairpin, as shown. As the construction and operation of the heaters of this type are well understood, no further description of the same is deemed necessary. The heaters 16 and 17 are carried by the side wall 11 of the tank and extend diametrically of the tank. The heaters 16 and 17 may be energized from a suitable power source, not shown, either in parallel or may be operated selectively in accordance with well-understood practice. While I have shown a plurality of heaters for heating the water, it will be understood that my invention may be applied equally well to a structure employing but one heater.

During normal operation, the heater 16 operates to uniformly impart heat to all of the water in the tank. The heater 17 is employed to heat the water in that portion of the tank which is elevated with respect to the heating element 17. In order that a body of high temperature water may be quickly made available for use adjacent the outlet port 15, I provide a baffle structure, generally indicated by the numeral 18, which is disposed above the heating element 17 for collecting the water heated thereby and for conveying the heated water to the uppermost region of the tank adjacent the outlet 15. The baffle structure 18 includes an insulated hood or canopy 19 which extends diametrically across the tank above and adjacent the heater 17. The terminal portions 21 of the hood 19 are secured in any well-understood manner, as by welding or soldering, to diametrically-opposed portions of the side wall 11. The central portion of the hood 19 is elevated with respect to the terminal portions 21 so that the hood slopes upwardly and inwardly as clearly shown in Fig. 1. The hood 19 is arched, as shown in Fig. 2, for directing the heated water inwardly of the hood. The central portion of the hood 19 is provided with an outlet opening 22 for the heated water moving upwardly beneath the arched and sloping walls defining the hood.

The heated water passing through the opening 22 moves upwardly through a conduit or flue structure 23 which terminates in an upper region of the tank 10. The heated water discharged by the flue 23 collects in the uppermost region of the tank adjacent the outlet opening 15 where it is made available for immediate use. The water displaced by the heated water entering the upper region of the tank, of course, moves downwardly on each side of the hood 19 and thence inwardly over the heater 11. This circulation of water is thermally induced as is well understood.

In order to prevent the transfer of heat from the relatively hot water beneath the hood 19 and within the conduit 23 to the lower temperature water above the hood and around the conduit, the walls defining the hood and conduit are heat insulated. Preferably, the walls forming the hood 19 and the conduit 23 are formed of metal having respective dead air spaces 24 and 25 formed therein. A covering of heat insulation 27 is provided for the tank to prevent loss of heat to the ambient atmosphere.

Reference will now be had to Figs. 4 and 5 of the drawings which illustrate a second embodiment of the invention. The structure of this embodiment includes a vertical, generally cylindrical, tank indicated by the numeral 30 and having a side wall 31 and top and bottom walls 32 and 33, respectively. The outlet for heated water is shown at 34 and the inlet for water to be heated is shown at 35. The water is heated by upper and lower heating elements 36 and 37, respectively, constructed similarly to the elements 16 and 17 in the prior embodiment except that the upper element 36 includes an inclined portion 38 extending upwardly within the tank. The element 37 functions to heat all of the water in the tank uniformly and the element 36 operates as a booster element to heat the water in the upper portion of the tank. The elements 36 and 37 are carried by suitable supports 39 and 41 which are secured to annular bosses 43 and 44 welded or otherwise secured to the wall 31 of the tank.

In order to concentrate the heated water rising from the element 36 adjacent the outlet port 34, a hood structure, generally indicated by the numeral 45, is arranged above and on each side of the element 36. As best shown in Fig. 5, the hood structure 45 is arched transversely and extends downwardly on each side of the element 36. Accordingly, a space 46 defining an inverted trough is arranged within the walls of the hood structure 45. The space 46 is open at its upper end for the passage of heated water from the space 46. Preferably, the hood structure 45 is insulated to prevent the transfer of heat from the relatively hot water within the space 46 to the lower temperature body of water surrounding the hood 45. The insulation of the hood 45 is, preferably, provided by a dead air space 47 arranged within the walls of the hood 45. The dead air space 47 may be defined by spaced, sheet wall members 48 and 49 which are secured together by bottom wall members 51 and end wall members 52 and 53.

The hood 45 is positioned within the tank 30 by a collar 54 secured to the hood 45 adjacent the end wall 52 in any suitable manner and extending within the annular boss 43. The inner end of the hood 45 may be supported by a brace 55, the ends of which are secured to the inner wall member 49 and the intermediate portion 38 of which rests upon the inclined portion 38 of the heater 36 as best shown in Fig. 5.

During operation of the heater 36, the heated water rising from the same passes upwardly beneath the inclined wall member 49 and outwardly through the open end of the space 46. This relatively hot water immediately rises and collects beneath the top wall 32 adjacent the outlet port 34. The water which is displaced by the heated water moves downwardly within the tank and around the underside of the hood 45 into the space 46 where it is heated by the heater 36. This thermally-induced circulation of the water continues until the heater 36 is deenergized. In usual practice, the heater 36 is deenergized thermostatically when the body of water in the upper region of the tank is heated to the desired temperature. Continued heating of the water in the tank is effected by the heater 37. Both the heaters 36 and 37 may be energized simultaneously or they may be selectively controlled so that they are energized alternatively, as is well understood.

From the foregoing description, it will be apparent that I have provided improved water heater constructions wherein small quantities of hot water are quickly made available for use even though the main body of water in the tank may be relatively cool. As the water is heated, it is directed by the hood toward the upper region of the tank adjacent the outlet. As heating continues, the body of hot water increases so that the "hot water line" progressively moves downwardly until it reaches the level of the top heater. In usual practice, this heater is then deenergized and continued heating of the lower body of water is effected by the lower heater.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In liquid heating apparatus, the combination of a tank for containing liquid to be heated, an electric heater extending inwardly within an upper region of the tank, a hood extending across at least a portion of the tank above and adjacent said heater, said hood being arched transversely for defining a zone above the heater for liquid heated thereby, and said hood having a portion thereof inclined upwardly and inwardly of the tank for facilitating the movement of heated liquid through said zone toward the top of the tank, means for admitting liquid to be heated to a region of the tank remote from and below the heater and means for conveying heated liquid from the uppermost region of the tank.

2. In water heating apparatus, the combination of a generally cylindrical tank having upper and lower end walls and a side wall, an electric heater carried by the side wall and extending inwardly of the tank within the upper region thereof, a heat insulating hood disposed above the heater and arched transversely for defining a zone within which at least a portion of said heater is arranged, said hood being fixed to the side wall and inclined upwardly and inwardly of the tank for directing the heated water in said zone toward the top of the tank, means for admitting water to the lower region of the tank below said heater and means for conveying heated water from the uppermost region of the tank.

3. In liquid heating apparatus, the combination of a tank for containing liquid to be heated, an electric heater disposed in said tank adjacent the top thereof, a hood extending across the tank and having at least a portion thereof disposed above and adjacent the heater, a vertically-extending conduit carried by the hood and terminating in spaced relation with the top of the tank, said conduit providing for passage of liquid from beneath the hood to the region of the tank above the conduit, means for admitting liquid to the lowermost region of the tank below said heater and means for conveying heated liquid from the uppermost portion of the tank which is elevated with respect to said conduit.

4. In water heating apparatus, the combination of a tank having top, bottom and side walls, an electric heater disposed in an upper region of the tank, a heat insulating hood structure extending across the tank and having at least a portion thereof disposed above and adjacent said heater, the under surface of said hood structure being arched for collecting heated water rising from the heater, a heat insulating conduit extending upwardly from the hood and terminating in spaced relation with the top wall of the tank for conveying heated water from beneath the hood structure to the upper region of the tank adjacent its top wall, means for admitting water to be heated to the lowermost region of the tank adjacent the bottom wall thereof and below said heater and means for conveying heated water from the uppermost region of the tank and above said conduit.

5. In water heating apparatus, the combination of a tank having top, bottom and side walls, an electric heater disposed in the tank adjacent the top wall thereof, a hood structure extending across the tank and having at least a portion thereof disposed above and adjacent said heater, the under surface of said hood structure being arched for collecting heated water rising from the heater, said hood being formed of spaced walls defining a heat insulating structure, a conduit extending upwardly from the hood and terminating in spaced relation with the top wall of the tank for conveying heated water from beneath the hood structure to the upper region of the tank adjacent its top wall, said conduit being formed of spaced walls defining a heat insulating structure, means for admitting water to be heated to the lowermost region of the tank adjacent the bottom wall thereof and below said heater and means for conveying heated water from said upper region of the tank and above said conduit.

6. In a water heating structure, the combination of a vertical, generally cylindrical tank for the water to be heated, an electric heater extending diametrically of the tank adjacent the top thereof, a heat insulating hood structure extending across the tank and having at least a portion thereof disposed above and adjacent said heater, said hood structure being secured at its ends to the tank and having an intermediate portion elevated with respect to its ends, the under surface of the hood structure being arched above the heater throughout, substantially, its length, a substantially vertical conduit carried by said elevated portion of the hood and terminating in spaced relation with the top of the tank for conveying heated water from beneath the hood to the uppermost region of the tank, means for admitting cold water to the lowermost region of the tank below the heater and means for conveying heated water from the uppermost region of the tank and above said conduit.

7. In water heating apparatus, the combination of a vertical, generally cylindrical tank for the water to be heated, an electric heater extending, generally, diametrically of the tank, in the upper region thereof, a heat insulating baffle aligned above the heater and having its end portions secured to the tank, said baffle sloping upward from its end portions toward the center thereof and said baffle being arched throughout, substantially, its length, a heat insulating conduit extending upwardly from the center of the baffle and terminating in the uppermost region of the tank for conveying heated water from beneath the baffle to said upper region of the tank, means for delivering cold water to a region of the tank below the heater and means for conveying heated water from the region of the tank aligned above said conduit.

8. In water heating apparatus, the combination of a tank containing the water to be heated, a generally horizontal electric heater extending across at least a portion of an upper region of the tank, an arched baffle aligned above the heater and having its end portions secured to the tank, said baffle sloping upwardly from its end portions toward the center thereof, a conduit extending upwardly from the center of the baffle and terminating in an uppermost region of the tank for conveying heated water from beneath the baffle to said uppermost region of the tank, means for delivering cold water to a lower region of the tank below the electric heater and means for conveying heated water from the uppermost region of the tank.

9. In a water heater, the combination of a tank for water to be heated, an electric heater disposed within an upper region of the tank, said heater having a portion thereof inclined upwardly within the tank, an inclined hood disposed above the heater and arched for defining a zone adjacent the heater for water heated thereby, said hood having the upper end thereof spaced from the top of the tank and said end being open for directly delivering heated water from said zone to said upper region of the tank, means for admitting cool water to the bottom portion of the tank and means for conveying heated water from the uppermost region of the tank.

10. In water heating apparatus, the combination of a generally cylindrical tank having side, top, and bottom walls, an electric heater carried by said side wall adjacent the top wall of the tank and extending inwardly and upwardly within the tank, an arched heat insulating hood disposed above said heater and defining a zone for heated water adjacent the heater, said hood having at least a portion thereof inclined upwardly and inwardly within the tank, the upper end of said zone being open for directly delivering heated water from said zone to the upper region of the tank, means for delivering cold water to the bottom of the tank and means for conveying heated water from said upper region of the tank.

JOSEPH H. REIFENBERG.